US006272172B1

(12) United States Patent
Deshpande et al.

(10) Patent No.: US 6,272,172 B1
(45) Date of Patent: Aug. 7, 2001

(54) MEASUREMENT ACQUISITION AND DISPLAY APPARATUS

(75) Inventors: Nikhil M. Deshpande, Beaverton; Kyle L. Bernard; Man-Kit Yau, both of Tigard, all of OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/052,801

(22) Filed: Mar. 31, 1998

(51) Int. Cl.$^7$ .................................................. H04B 17/00
(52) U.S. Cl. ............................................................ 375/228
(58) Field of Search ..................................... 375/316, 228, 375/321, 324, 346, 340, 227, 224; 455/35, 135, 161.3, 226.3, 154.2, 158.4, 161.2; 370/252, 253; 345/133, 134, 135; 324/379

(56) References Cited

U.S. PATENT DOCUMENTS

| | | | |
|---|---|---|---|
| 5,499,375 | * | 3/1996 | Miyaguchi ............................... 712/2 |
| 5,592,173 | * | 1/1997 | Lau et al. ......................... 342/357.12 |
| 5,603,088 | * | 2/1997 | Gorday et al. ....................... 455/67.3 |
| 5,613,218 | * | 3/1997 | Li et al. .................................. 455/71 |
| 5,627,860 | * | 5/1997 | McKinny et al. ...................... 375/317 |
| 5,628,321 | * | 5/1997 | Scheib et al. .................... 128/661.08 |
| 5,650,769 | * | 7/1997 | Campana, Jr. ........................ 340/573 |
| 5,651,037 | * | 7/1997 | Barrett, Jr. et al. ................. 375/377 |
| 5,706,202 | * | 1/1998 | Itahara et al. ........................... 702/77 |
| 5,736,845 | * | 4/1998 | Kosuge ............................... 324/67.27 |
| 5,761,196 | * | 6/1998 | Ayerst et al. ......................... 370/335 |
| 5,905,443 | * | 5/1999 | Olds et al. . |
| 5,905,459 | * | 5/1999 | Bunch ................................... 342/92 |
| 5,907,797 | * | 5/1999 | Hanatatsu et al. .................... 455/115 |
| 5,949,399 | * | 7/1999 | Kreft et al. ........................... 345/134 |
| 5,949,812 | * | 9/1999 | Turney et al. ........................ 375/200 |
| 6,061,393 | * | 5/2000 | Tsui et al. ............................. 375/224 |
| 6,140,809 | * | 10/2000 | Doi ..................................... 324/76.24 |

OTHER PUBLICATIONS

Measuring Peak and Average Power of Digitally Modulated Advanced Television System, Charles W. Rhodes, IEEE Transactions on Broadcasting, vol. 38, No. 4, Dec. 1992.
Measuring Peak/Average Power Ratio of the Zenith/AT&T DSC–HDTV Signal with a Vector Signal Analyzer, Gary Sgrignoli, IEEE Transactions on Broadcasting, vol. 39, No. 2, Jun. 1993.
Planning Your Digital Television Transmission System Robert J. Plonka, 1997 NAB paper.

\* cited by examiner

*Primary Examiner*—Chi Pham
*Assistant Examiner*—Bayard Emmanuel
(74) *Attorney, Agent, or Firm*—William K. Bucher; Francis I. Gray

(57) ABSTRACT

A measurement acquisition and display system generates graphical displays of Cumulative Distribution Function (CDF) peak-to-average power ratio measurements of a digitally modulated RF signal and an ideal digitally modulated RF signal, such as an 8-VSB digital television signal. A variable target operating point or planning factor value is enterable into the system that defines an operating point on the ideal CDF of peak-to-average power ratio display. The corresponding operating point on the RF signal CDF of peak-to-average power ratio display is determined and numerically displayed along with a numerical display of the difference between the ideal and real operating points. Alarm limit variables may be set for generating an alarm signal when the RF signal peak-to-average power ratio exceeds the alarm limits. The measurement acquisition and display system further generates a graphical display of channel frequency spectrum of the digitally modulated RF signal.

9 Claims, 7 Drawing Sheets

MEASUREMENT ACQUISITION AND DISPLAY APPARATUS

BACKGROUND OF THE INVENTION

The present invention relates generally to processing and displaying digital data and more specifically to processing digitally modulated RF signals for presenting measurement data related to the peak-to-average power of a digitally modulated RF signal, such as 8-VSB digital television signals.

The Federal Communications Commission has adopted the Digital Television Standard developed by the Advanced Television Systems Committee (ATSC). The Digital Television Standard is designed to transmit high quality video and audio and ancillary data over a 6 MHZ channel. The system delivers reliably over 19 Mbps of throughput in a 6 MHZ terrestrial broadcasting channel and about 38 Mbps of throughput in a 6 MHZ cable television channel where a higher signal to noise ratio is ensured. The Standard describes the channel coding and modulation RF/transmission subsystems for terrestrial and cable applications. The modulation uses a digital data stream to modulate the transmitted signal. The modulation subsystem offers two modes: a terrestrial broadcast mode (8-VSB), and a higher data rate mode (16-VSB).

The modulation technique implemented in the Digital Television Standard employs vestigial sideband modulation that was developed by Zenith Electronics Corporation. The overall system response of the combined transmitter and receiver utilizes a raised cosine filter to eliminate inter-symbol interference. The system response is implemented with matched root raised cosine filters in the transmitter and in the receiver. The incoming digital data stream is randomized, forward error corrected (FEC) and interleaved. The randomized, FEC coded and interleaved data is trellis encoded as an 8-level (3-bit) one dimensional constellation. The outputs of the trellis coder are referred to as symbols that are one of eight discrete odd level integers from −7 to +7 set by the encoder. To aid synchronization in low signal to noise and high multipath situations, segment and field syncs are added to the 10.76 Msymbols/sec signal as well as a small pilot tone at the carrier frequency generated by offsetting the real or I channel of the composite signal containing the data and the sync pulses by 1.25 units. At the transmitter, the composite signal passes through a root raised cosine filter and modulates an intermediate frequency carrier signal which is up-converted to an RF frequency for transmission at the desired channel frequency. The offset causes the pilot tone to be in-phase with the I channel carrier frequency. Alternately, the composite signal may directly modulate the RF carrier.

In the Digital Television Standard, the average power of the digital TV signal is independent of the scene content, motion, and other variables and is suitable for measuring. However, because of the nature of the digital modulation scheme, transient peaks exist in the transmitted signal that are random in nature and need to be expressed statistically in terms of percentage of time in which the transient exceeds the average power by a stated value expressed in dB. Through measurements on experimental digital transmission systems, the optimum ratio of the transient peak power to the average peak power is stated as being approximately 6 dB. With 6 dB of headroom between the average power and the peak power, transient peaks will be encountered in a range of about 0.24% of the time. These transient peaks are important for non-linear considerations, such as compression of the output devices and voltage breakdown in transmission lines.

A paper titled "Measuring Peak/Average Power Ratio of the Zenith/AT&T DSC-HDTV Signal with a Vector Analyzer" by Gary Sgrignoli appearing in the IEEE Transactions of Broadcasting, Vol. 39, No.2, June 1993 describes a Cumulative Distribution Function (CDF) of peak-to-average power ratio for digital television signals and the requirements and process for making this measurement using a Hewlett-Packard 89440A Vector Signal Analyzer. The HP 89440A Vector Signal Analyzer was used to acquire and processes the HDTV signal to produce a time versus voltage output display that is interpretable as a CDF of peak-to-average power ratio display. Because CDF displays are not a resident function in the vector analyzer, there was a requirement for programming the vector analyzer to acquire and display the relevant data using an Instrument BASIC program language built into the instrument that includes a resident editor, debugger and programming utilities. The instrument was programmed to initialize the instrument to power-on default parameters and provide a prompt for entering the center frequency of the modulated RF or IF data signal and to specify the number of captured data blocks ("runs") to process. The average power of the HDTV power envelope was determined by using power band markers set to a 6.0 MHz bandwidth centered around the center frequency. A long term measurement was performed in which the signal was RMS-averaged for 100 data blocks. Time samples of the signal envelope power samples were captured over a data block of 2048 sample points and a peak-to-average power histogram was created. The instrument looped back and acquired another block of envelope time samples in a single sweep mode until the initially specified number of runs was completed. The author indicated that 100 data blocks were used for acquiring and displaying the data.

A CDF display was created by scaling and integrating the peak-to-average histogram. The x-axis of the display was labeled as time in μsec instead of peak-to-average power ratio in dB, and the y-axis was labeled as voltage in $V_{pk}$ instead of percentage. This was the result of using the vector signal analyzer screen to display nonstandard output data. The author indicated that the displayed data could be more accurately displayed by converting the CDF plot to a Y-axis log plot by transferring the data to a floppy disk and using external plotting software. The CDF plot was converted to ASCII format on a PC-compatible computer using Hewlett-Packard utilities software. The data was then read into a stand-alone graphics software package for subsequent log plotting. The time versus voltage plot on the Vector Signal Analyzer could be interpreted by reading the Y-axis marker directly as percent and not as $V_{pk}$ and reading the X-axis marker value directly as dB and not as μsec and subtracting 30.

A later version of the Hewlett-Packard vector signal analyzer, the HP89441A, provides a user with a selectable peak percentage value and reads out a peak-to-average power ratio in dB without providing a display of the CDF of peak-to-average power ratio. Using buttons on the front panel of the instrument, the user calls up a menu for selecting a peak percentage of time values between 90 and 99.9%. The instrument acquires and processes the IF signal representative of the HDTV RF signal and reads out the peak-to-average power ratio for the selected peak percentage of time value.

The use of the above described instruments requires a technical knowledge by the user in 8-VSB technology. This knowledge would include an ability to relate the CDF plot of peak-to-average power ratio to an ideal CDF plot of peak-to-average power ratio and use that knowledge in relation to an "operating point" or "planning factor" for setting up the 8-VSB transmitter. The user would need knowledge of what an ideal CDF plot of peak-to-average power ratio looks like and the x and y coordinates for the various points on the ideal CDF curve. The user would also have to have an ability to interpret the time versus voltage display into the CDF plot of peak-to-average power ratio. It also requires a user to download data from the instrument to a PC and perform additional processing to accurately generate a CDF plot of peak-to-average power ratio. To generate a CDF plot of peak-to-average power ratio using the later version instrument would require manually selecting a series of peak percentage values from the available peak percentage values and manually plotting on paper the resulting peak-to-average power ratio values.

What is needed is a measurement acquisition and display system for generating and displaying a graphical representation of a CDF of peak-to-average power ratio of a digitally modulated RF signal, such as the 8-VSB terrestrial broadcasting signal, along with an ideal CDF of peak-to-average power ratio graphical representation of the 8-VSB terrestrial broadcasting signal for comparing with the real peak-to-average power ratio measurement. The measurement acquisition and display system should allow a user to enter planning factor information and receive data back based on the acquired and displayed CDF of peak-to-average power ratio measurement. In addition, the measurement acquisition and display system should access the total range of peak-to-average power ratio values and percent of time values associated with the CDF of peak-to-average power ratio measurement. Further, the measurement acquisition and display system should provide continuous monitoring and alarm capabilities.

SUMMARY OF THE INVENTION

Accordingly, an object of the present invention is a measurement acquisition and display system that graphically displays Cumulative Distribution Function (CDF) of peak-to-average power ratio measurement curves of both a real and ideal digitally modulated radio frequency signal.

Another object of the present invention is a measurement acquisition and display system that provides selectable planning factor values for tuning a transmitter generating a digitally modulated radio frequency signal.

A further object of the invention is a measurement acquisition and display system that displays numerical values relating a planning factor value to real and ideal statistical data arrays containing peak-to-average power ratio values and associated percent of time values of the peak-to-average power ratio measurement curves.

An additional object of the present invention is a measurement acquisition and display system that provides selectable alarm values for generating alarm signals when the peak-to-average power ratio of the radio frequency signal exceeds the alarm values.

A still further object of the present invention is a measurement acquisition and display system that generates and displays a frequency spectrum of the digitally modulated radio frequency signal.

The measurement acquisition and display system of the present invention is suitable for receiving a digitally modulated radio frequency signal and generating digital data values representative of a digitally modulated intermediate frequency signal down converted from the digitally modulated radio frequency signal. The system includes a processor which processes the digital data values for generating an average power value representative of the radio frequency signal. The processor further generates a first statistical array containing a first set of values representative of peak power levels of the radio frequency signal deviating from the average power of the radio frequency signal and a second set of values representative of percents of time the peak power values deviate from the average power with each peak-to-average power ratio value having an associated percent of time value. The system includes a memory containing a second statistical array representative of a corresponding ideal digitally modulated radio frequency signal containing a first set of values representative of ideal peak-to-average power ratios of the ideal radio frequency signal and a second set of values representative of ideal percent of time associated with the ideal peak-to-average power ratio values. A display device graphically displays the peak-to-average power ratio values and associated percent of time values of first and second statistical arrays representing the digitally modulated radio frequency signal and the corresponding ideal digitally modulated radio frequency signal.

The system includes a planning factor function where the processor accepts a variable value representative of a planning factor value and matches the planning factor value with one of the ideal peak-to-average power ratio values for determining the corresponding peak-to-average power ratio value of the radio frequency signal. The processor determines the peak-to-average power ratio value of the radio frequency signal by matching the ideal percent of time value associated with the ideal peak-to-average power ratio value with the closest percent of time value associated with the peak-to-average power ratio value of the radio frequency signal. The processor calculates a difference value between the ideal peak-to-average power ratio value and the peak-to-average power ratio value of the radio frequency signal and numerically displays the difference value along with the planning factor value, the ideal percent of time value associated with the ideal peak-to-average power ratio value matched to the planning factor value and the corresponding peak-to-average power ratio value of the radio frequency signal matched to the ideal percent of time value on the display device.

The system is configurable for changing the planning factor value to percent of time values with the processor accepting a variable value representative of a percent of time planning factor value and matching the percent of time planning factor value with an ideal percent of time value and its associated ideal peak-to-average power level ratio value for determining the corresponding peak-to-average power level ratio value of the radio frequency signal. The processor matches the ideal percent of time value with the closest percent of time value associated with the peak-to-average power ratio value of the radio frequency signal. The processor calculates the difference value between the ideal peak-to-average power ratio value and the peak-to-average power ratio value of the radio frequency signal and numerically displays the difference value along with the percent of time planning factor value, the ideal peak-to-average power ratio value associated with ideal percent of time value correlated with the planning factor value and the corresponding peak-to-average power ratio value of the radio frequency signal matched to the ideal percent of time value on the display device.

The system further includes intersecting vertical and horizontal cursors generated by the processor and having an intersecting point value equal to the ideal peak-to-average power ratio value matching the planning factor value. The display device graphically displaying the intersecting vertical and horizontal cursors with the intersection point positioned on the ideal digitally modulated radio frequency signal graphical display where the intersecting point value equals the ideal peak-to-average power ratio value. The processor further generates the intersecting vertical and horizontal cursors where the intersecting point value equals the ideal percent of time value matching the planning factor value. The display device graphically displaying the intersecting vertical and horizontal cursors with the intersection point positioned on the ideal digitally modulated radio frequency signal graphical display where the intersecting point value equals the ideal percent of time value.

The measurement acquisition and display system further accepts a variable value representing an alarm limit for generating an alarm signal when the peak-to-average power ratio value of the radio frequency signal corresponding to the ideal peak-to-average power ratio value matched to the planning factor value exceeds the alarm limit. The system also accepts a variable value representing an alarm limit for generating an alarm signal when the difference value between the peak-to-average power ratio value of the radio frequency signal and the ideal peak-to-average power ratio value at the percent of time value exceeds the alarm limit.

The system further includes the processor processing the digital data values for generating frequency spectrum values representing the frequency spectrum of the digitally modulated radio frequency signal. The display device generates a graphical display of the frequency spectrum values representing the frequency spectrum of the digitally modulated radio frequency signal.

The processor in the system according to the present invention further accepts a first value representative of graphical display of the peak-to-average power ratio values and associated percent of time values of first and second statistical arrays representing the digitally modulated radio frequency signal and the corresponding ideal digitally modulated radio frequency signal and a second button value representative of the graphical display of the frequency spectrum values of the digitally modulated radio frequency signal for selectively displaying on the display device the graphical display of the peak-to-average power ratio values and associated percent of time values of first and second statistical arrays representing the digitally modulated radio frequency signal and the corresponding ideal digitally modulated radio frequency signal and the graphical display of the frequency spectrum values of the digitally modulated radio frequency signal.

The objects, advantages and novel features of the present invention are apparent from the following detailed description when read in conjunction with the appended claims and attached drawings.

DETAILED DESCRIPTION OF THE PREFERRED EMBODIMENT

Figure 1:
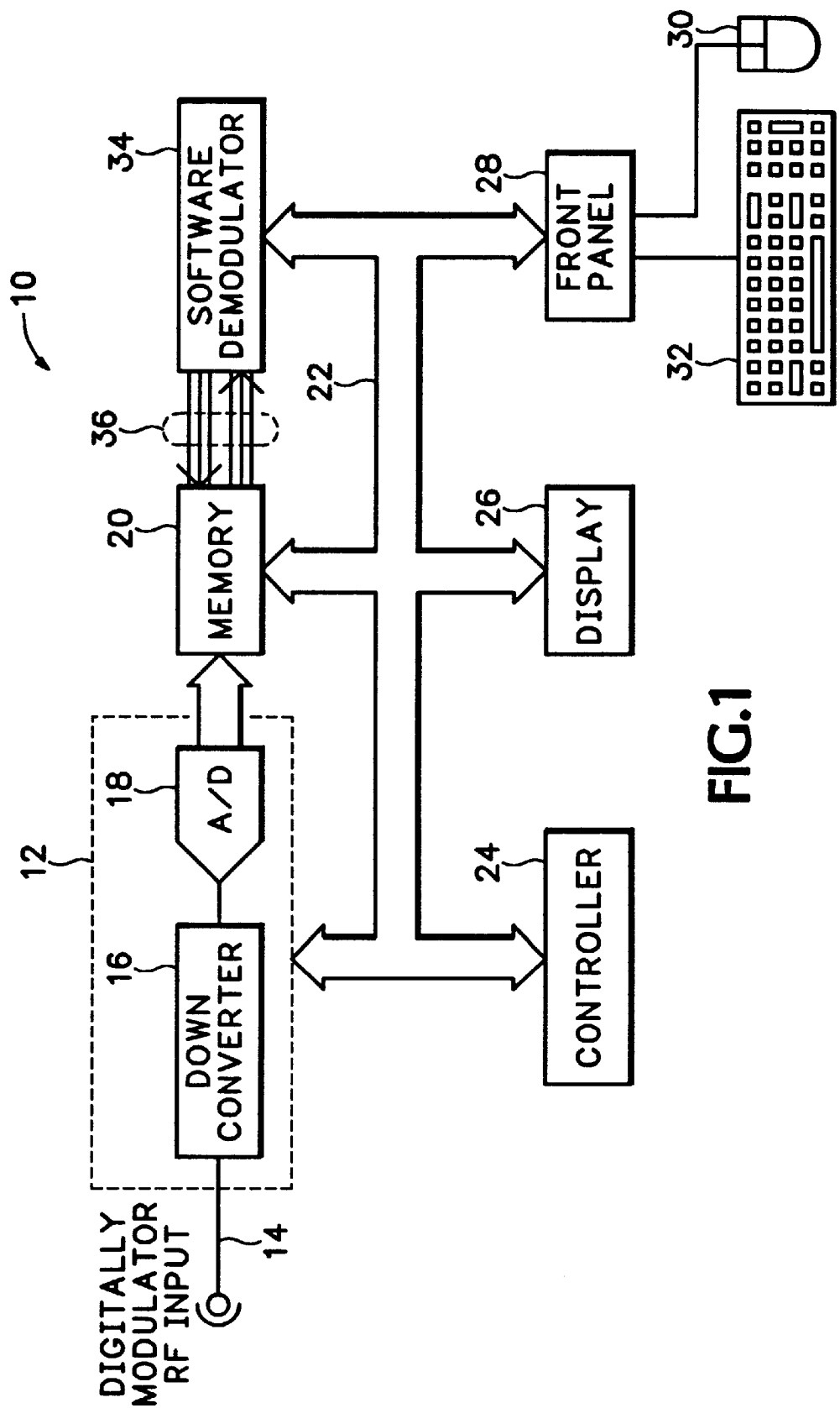
FIG. 1 is a representative block diagram of a measurement acquisition and display system for displaying Cumulative Distribution Function peak-to-average power ratio measurements according to the present invention.

Referring to FIG. 1, there is shown a representative block diagram of a measurement acquisition and display system 10 for displaying acquired and processed digital data values of a digitally modulated radio frequency (RF) signal. The measurement display system 10 includes a hardware front end 12 receiving a digitally modulated RF input signal 14. The RF signal 14 is down converted to a digitally modulated intermediate frequency (IF) signal by hardware down converter circuitry 16 that generally includes one or more mixers in the IF signal path. Each mixer is driven by a local oscillator. An analog-to-digital (A/D) converter 18 receives the digitally modulated IF signal and converts the signal to digital data values that are stored in memory 20. Memory 20 includes both RAM, ROM and cache memory with the RAM memory storing volatile data, such as the data values representative of the IF signal and the like, the ROM storing non-volatile data, such as program control instructions used by the instrument 10 and constant data values, and cache memory storing data for immediate microprocessor access. A data and control bus 22 couples memory 20 to a controller 24, such as PENTIUM microprocessor, manufactured and sold by Intel Corporation, Santa Clara, Calif. The data and control bus 22 is also coupled to the front end hardware 12, a display device 26, such a liquid crystal display, cathode ray tube or the like, and a front panel 28 having input devices, such as buttons, knobs, switches or the like directly mounted on the front panel or a mouse 30 or keyboard 32. The display device 26 may implemented with touch screen capability providing a further input device means as is implemented in the present invention. A software demodulator 34 is representatively shown connected to the bus 22 and coupled to memory 20. The software demodulator 34 executes various processes that are performed by a controller 24 using processing routines stored in ROM memory 20. A data flow line 36 connects the memory 20 with the software demodulator 34 for showing the movement of data from the memory 20 to the software demodulation process and back. The measurement acquisition and display system 10 in the preferred embodiment of the invention is a PC based system controlled under WINDOWS 95 operating system, manufactured and sold by Microsoft Corporation, Redmond, Wash., using standard user interface mechanisms referred to as controls and indicators. Controls include display buttons, tabbed pages, spin boxes and the like. Indicators include status bar help, time stamp readout, graphical display area and the like. Static text regions are display areas that are established by the system designer and not changeable by a user. Graphical plotting software, such as PROESSENTIALS Graphic Display Software, manufactured and sold by Gigasoft, Inc. Keller Tex., is used for generating graphical representations of Cumulative Distribution Function (CDF) of peak-to-average power ratio array data and frequency spectrum data.

The present invention will be described in relation to an 8-VSB digitally modulated RF signal. It is understood that other digitally modulated RF signals 14 may be used with the present invention without departing from the scope of the appended claims. An 8-VSB RF signal has data symbols that modulate the RF carrier at a symbol frequency in the range of 10.76 Msymbols/sec. In the preferred embodiment of the measurement acquisition and display system 10, the IF carrier signal is locked to an integer multiple of the symbol frequency where the integer multiple is equal to or greater than one. If, for example, the integer multiple is set to one then the IF carrier is at symbol frquency. The A/D converter 18 is clocked at an integer multiple of the IF carrier where the integer multiple is equal to or greater than one. Specifically, the A/D converter 18 samples the digitally modulated intermediate frequency signal at four times the IF carrier. Four digital data samples are generated for each 8-VSB symbol. A data block in the range of about 16,000 digital data values are acquired and stored for generating a graphical CDF display of peak-to-average power ratio of the digitally modulated RF signal 14. A subset of the data block containing in the range of about 4,000 digital data values is used for generating a frequency spectrum graphical display of the digitally modulated RF signal 14. The measurement acquisition and display system 10 operates in a continuous acquisition and display mode where blocks of digital data values are acquired and processed with the results being displayed on display device 26 prior to each acquisition.

Figure 2:
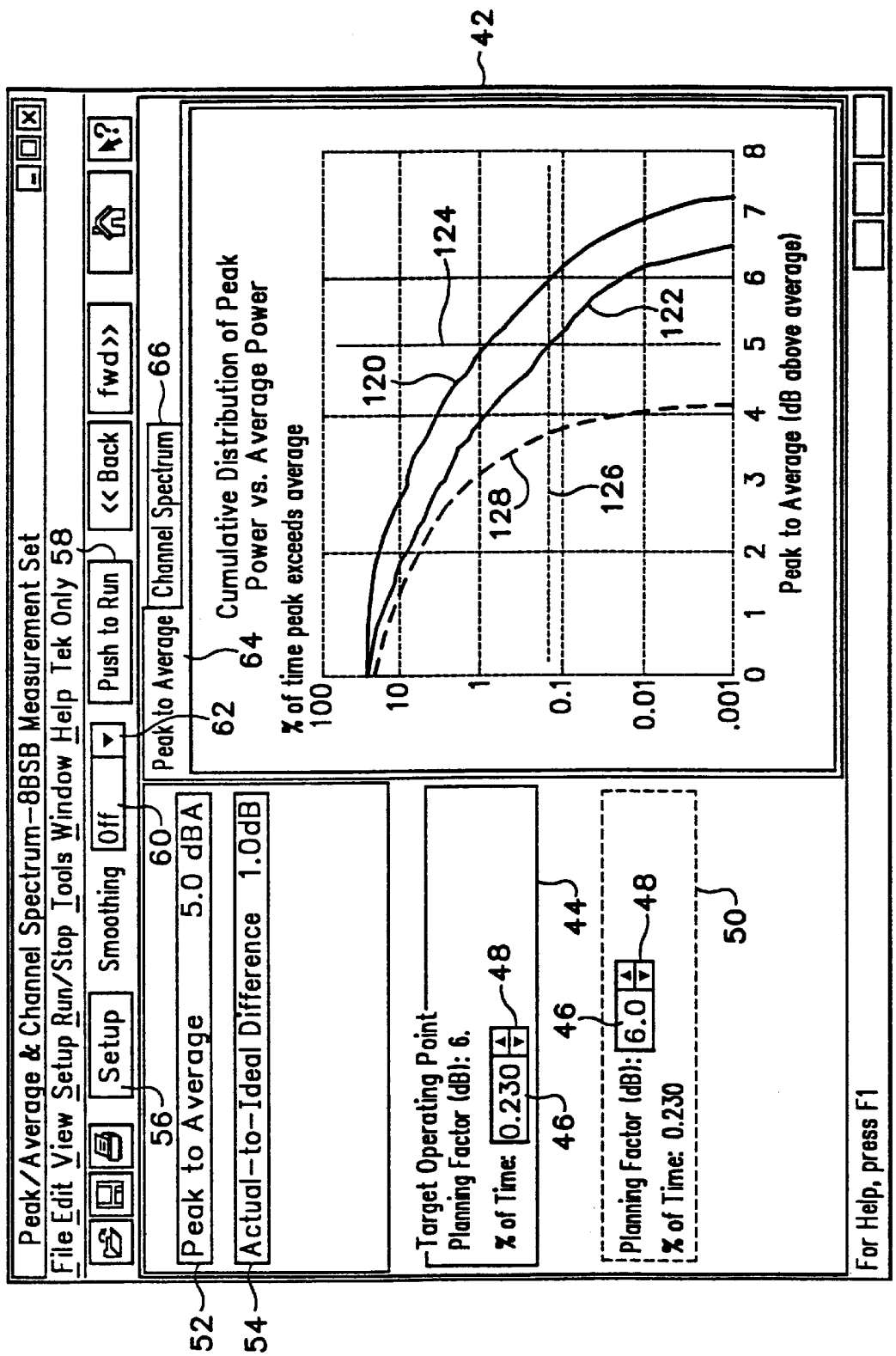
FIG. 2 is a representative display generated on a display device in the measurement acquisition and display system according to the present invention.

Referring to FIG. 2, there is shown a representative display 40 generated on display device 26 incorporated in the present invention. The display 40 is configured in the WINDOWS 95 display format using its standard user interface mechanisms. Display 40 includes a graphical display 42 area for displaying graphical representations of real and ideal CDF plots of peak-to-average power ratio data and the frequency spectrum data. A selectable "Target Operating Point" static text display 44 allows a user to select a "Planning Factor" value using a spin box 46 with up and down arrow buttons 48. The "Planning Factor" value may be defined in "% of Time" as shown in static text display 44 or in dBs as shown in the dashed box representing the other static text display 50. It should be noted that one or the other of the "Planning Factor" displays will be displayed in the "Target Operating Point" static text display 44 at any one time. Another static text display 52 indicates a "Peak to Average" value for the peak-to-average power ratio data of the RF signal that is generated in relation to the "Planning Factor" value. A further static display 54 indicates an "Actual-to-Ideal Difference" value that is a calculated difference between corresponding peak-to-average power ratio values of the real and ideal peak-to-average power ratio data. A setup button 56 is provided for launching setup tabbed page displays. A "Push to Run" button 58 starts and stops the acquisition and display of the peak-to-average power ratio data. Various smoothing levels for the peak-to-average power ratio data are selected using a spin box 60 and button 62. Peak to Average tab 64 and Channel Spectrum tab 66 respectively change the graphical display 42 to present the graphical representation of real and ideal CDF plots of peak-to-average power ratio data or the frequency spectrum data.

Figure 3:
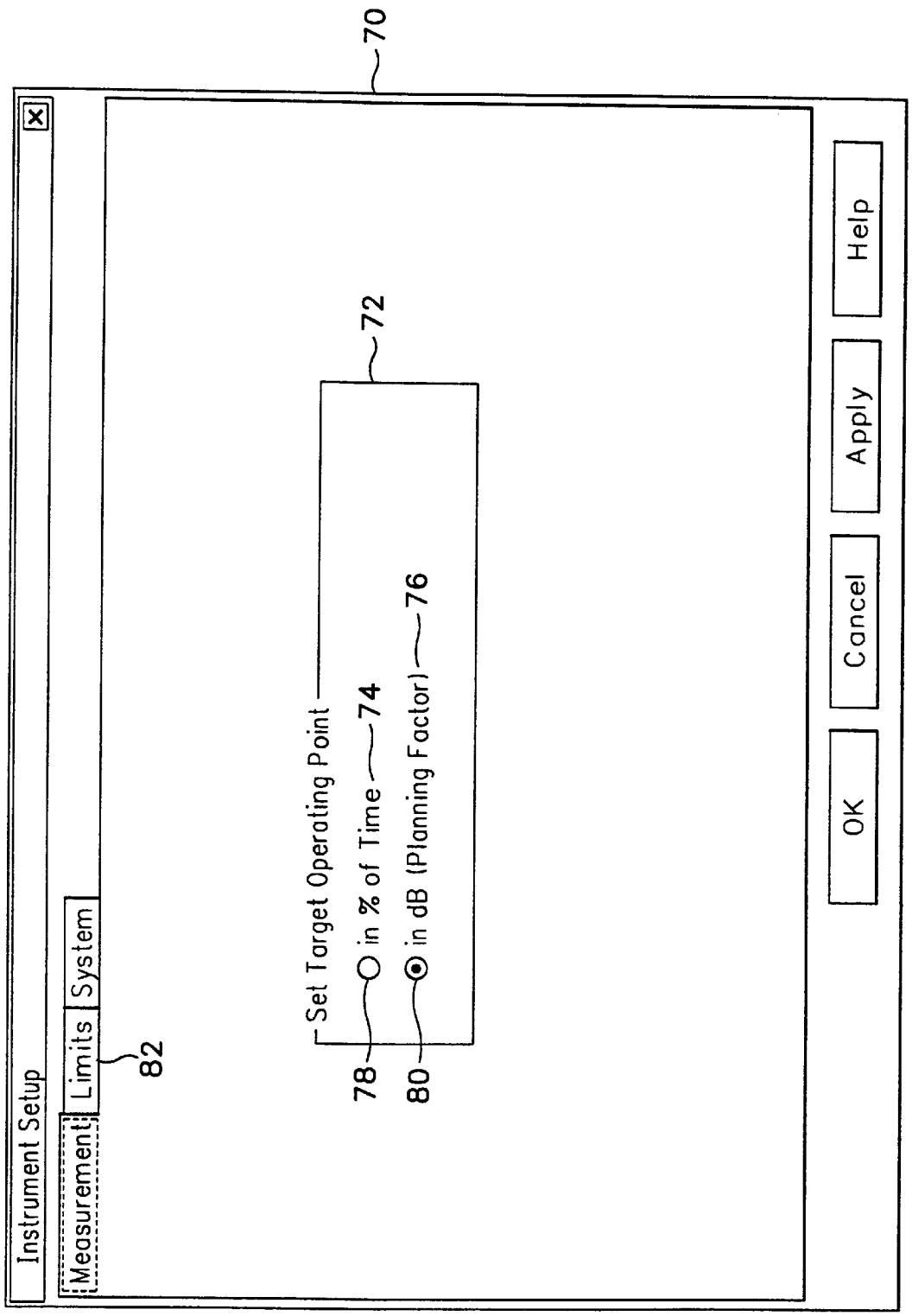
FIG. 3 is a "Measurement" tabbed page display in the measurement acquisition and display system according to the present invention.
Figure 4:
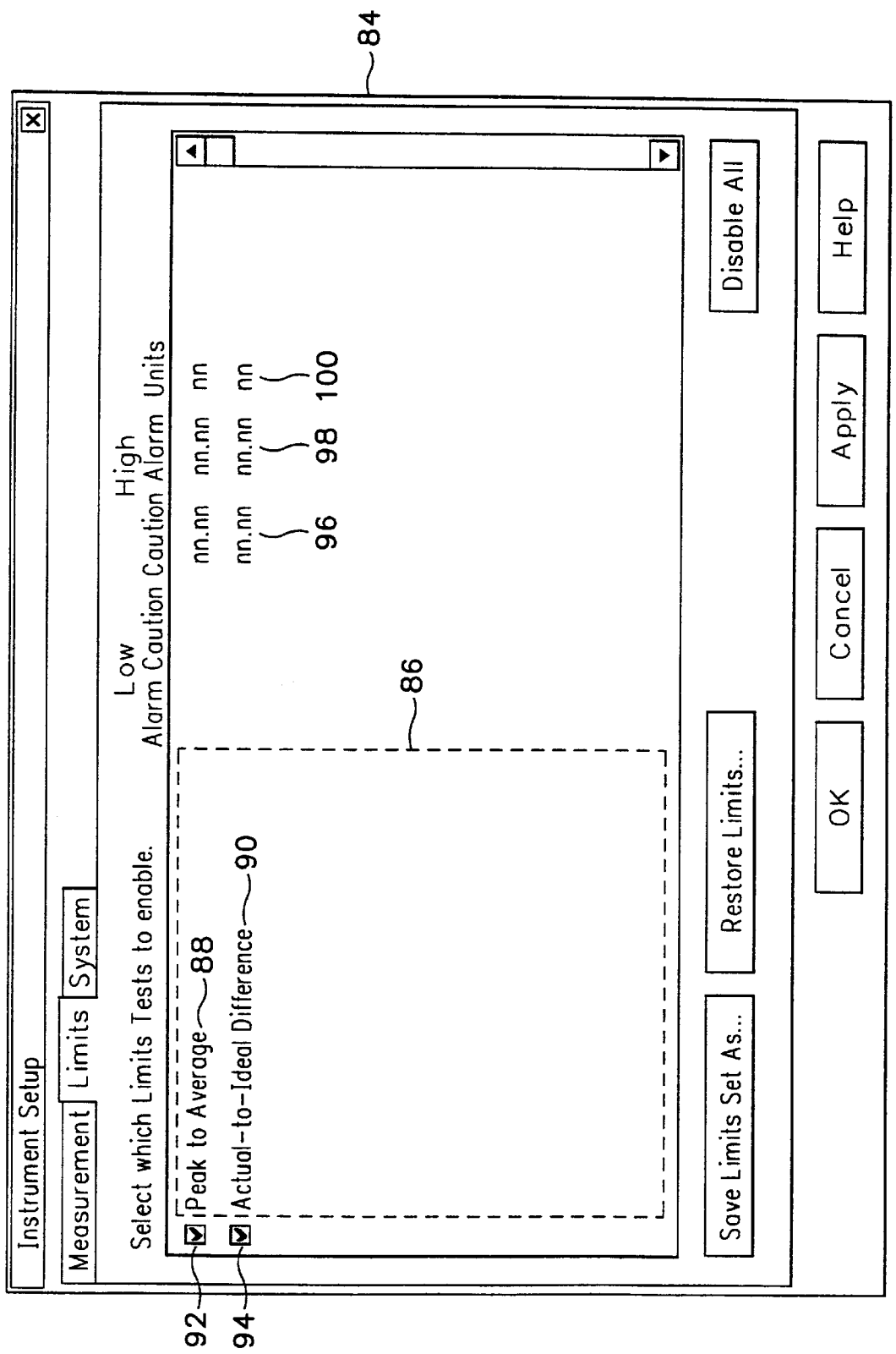
FIG. 4 is a "Limits" tabbed page display in the measurement acquisition and display system according to the present invention.
Figure 5:
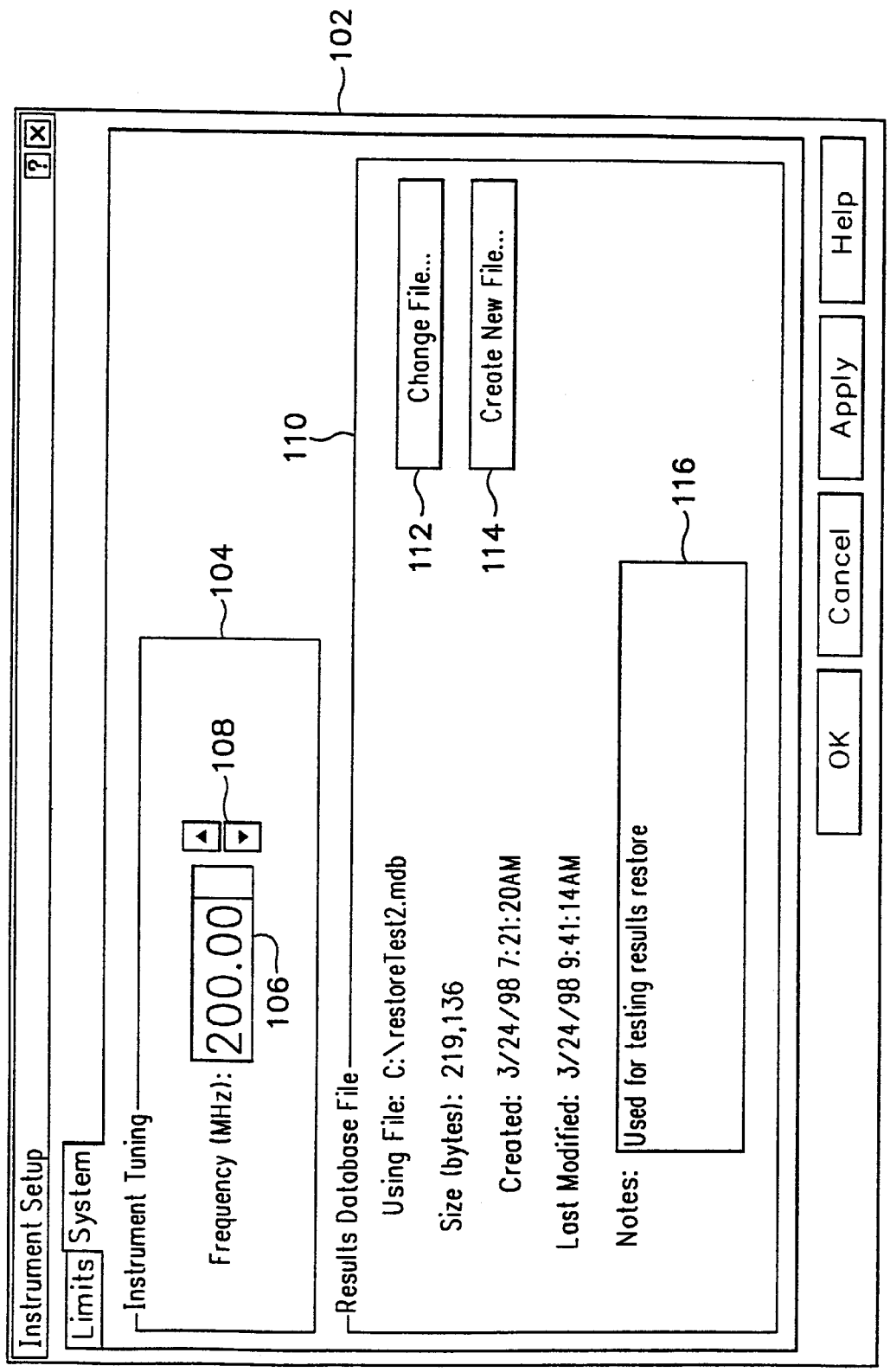
FIG. 5 is a "System" tabbed page display in the measurement acquisition and display system according to the present invention.

Referring to FIG. 3, there is shown a first setup tabbed page display 70 called "Measurement". The "Measurement" setup tabbed page display 70 includes a "Set Target Operating Point" static text display 72 that includes a "in % of Time" static text display 74 and a "in dB (Planning Factor)" static text display 76. Associated with each of the static text displays 74 and 76 are option button controls, respectively numbered 78 and 80, for allowing a user to set the spin box 44 and the associated "Planning Factor" static text display to "in % of Time" or "dB (Planning Factor)". Clicking the mouse 30 or touching the display device 26 screen on the "Limits" tabs launches a "Limits" tabbed page display 84 as shown in FIG. 4. The "Limits" tabbed page 84 includes a static text display area 86 containing a text list of available limit tests, such as a "Peak to Average" limit test 88 and a "Actual-to-Ideal Difference" limit test 90. Associated with each limit test is a check box 92 and 94 that is clicked on or touched to set the particular limit test on or off. Also associated with each limit test are cells 96 and 98 for setting alarm limit values. Cell 100 is a static text display indicating the units of the alarm limit values, such as dB for the "Peak to Average" and "Actual-to-Ideal Difference" limits. Clicking the mouse 30 or touching the display device 26 screen on the "System" tabs launches a "System" tabbed page display 102 as shown in FIG. 5. The "system" tabbed page 102 includes a static text display area "Instrument Tuning" 104 having a spin box 106 and associated up/down buttons 108 for setting a channel frequency to which the instrument is tuned to using the down converter circuitry 16 in the front end hardware 12. Another static text display area "Result Database File" 110 includes file buttons 112 and 114 for opening a standard type WINDOWS 95 open window for respectively changing a file or creating a new file. Creating or changing to a new file updates file information in the "Result Database File" 110 static text display area. A "Notes" editable text box 116 is provided in the "Result Database File" 110 static text display area for user entered information.

Figure 6:
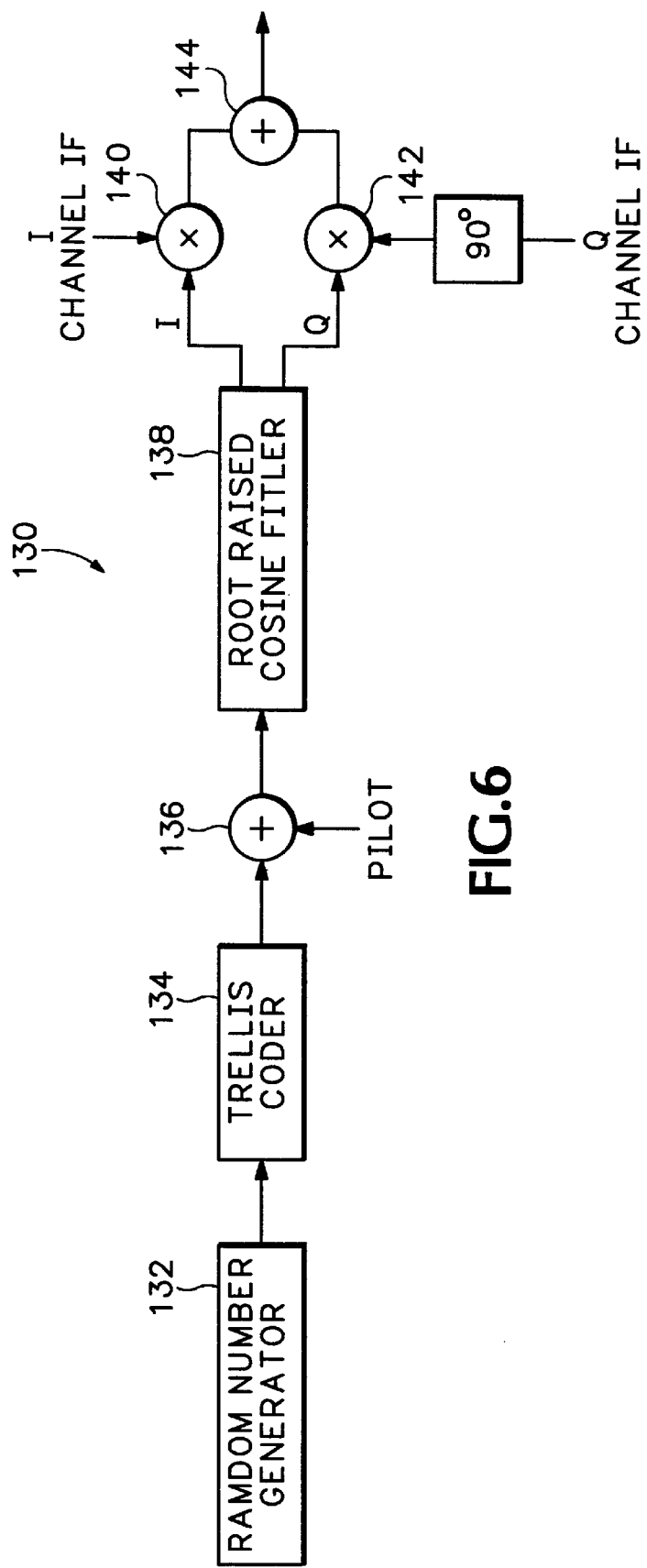
FIG. 6 is a block diagram of digital modulation IF signal generator for generating an ideal digitally modulated IF signal for producing ideal peak-to-average power ratio values and percent of time values used in the measurement acquisition and display system according to the present invention.

The measurement acquisition and display system 10 of the present invention graphically displays CDF plots of peak-to-average ratio of an ideal RF transmitter signal and a real RF transmitter signal along with a frequency spectrum plot of the real RF transmitter signal. The data for generating the CDF plot of peak-to-average power ratio 60 representing an ideal transmitter signal is produced using digital modulating IF generator 130 shown in the block diagram of FIG. 6. A random number generator 132 generates uniformly distributed random numbers that are trellis coded by a trellis coder 134. A pilot signal 136 is added to the trellis coded values and passed through a root raised cosine filter 138. The I and Q outputs of the filter 138 respectively modulate two IF signals in phase quadrature having frequency modulators 140 and 142 at the same frequency. The two quadrature digitally modulated IF signals from the modulators 140 and 142 are summed in a summing circuit 144 to produce an IF signal representative of an ideal RF transmitter signal. A total of 500,000 random values are generated and passed through the digital modulation IF generator 130. The output of the digital modulation IF generator 130 is digitized by an analog-to-digital converter (not shown) and processed to generate a first set of values representative of ideal peak power levels of an ideal radio frequency signal deviating from an ideal average power level of the ideal radio frequency signal and a second set of values representative of an ideal percent of time the ideal peak power levels deviate from the ideal average power level. Each ideal peak-to-average power ratio value has an associated ideal percent of time value. These empirically derived values are stored in an ideal peak-to-average power ratio array in ROM memory 20. The empirically derived values may also be stored on a removable floppy disk, a hard drive, CD-ROM or the like for transfer into memory 20. Further, the empirically derived data may be down loaded to the memory 20 from an external source over a data transfer line, such as RS232, GPIB, LAN network, wireless link or the like. Alternately, the ideal peak-to-average power ratio array data may be mathematically derived and stored in memory 20.

As previously described, approximately 16,000 digital data values are acquired for generating the CDF of peak-to-average power ratio data and the frequency spectrum data of the digitally modulated RF signal. A peak-to-average power ratio array is established in memory 20 containing a first set of values representative of peak-to-average power ratios of the RF signal. A second set of values represent percent of time of the respective peak-to-average power ratio values of the RF signal with each peak-to-average power ratio value having an associated percent of time value. The average power level of the RF signal is derived by summing the squares of each of the digital data values and dividing the summed results by the number of digital data values. The resulting average value is logged to convert the linear average power to decibels.

The peak-to-average power ratio values are generated by first establishing an array of counters with each counter having an assigned decibel value. In the preferred embodiment of the invention, the array covers a dB range from 0.01 dB to 10 dB with each counter having an assigned value of 0.01 dB greater than the previous counter value. Because the digital data values are acquired at four times the symbol frequency, four digital data values are processed for determining the envelope power of a point. A sequential process is initiated starting with the first four digital data values in the block of approximately 16,000 digital data values as a first set. The four digital data values in the set are squared, summed and divided by the four to determine the envelope power of the first point in the set. The envelope power for this point is stored in an array of envelope power values. The set is moved one digital data value and the four values in the new set are squared, summed and divided by four to generate the envelope power of the second digital data value in the block of digital data. This value is stored in the envelope power array and the sequential process continues through the block of digital data generating envelope power values for each of the digital data values. The envelope power values in the array are logged to converted the linear envelope power values to decibels. Difference values are determined for each of the envelope power values by subtracting the average power value from each of the envelope power values in the array with each difference value incrementing the appropriate counter in the counter array if the difference value is greater than zero. The count on each of the counters is divided by the total number of digital data values in the block of digital data with each resulting value being multiplied by one hundred to produce a percent of time value for each counter. The dB values for the counters are stored as the first set of values in the peak-to-average power ratio array and the percent of time values determined for the counters are stored as the second set of value in the peak-to-average power ratio array.

The generation of the frequency spectrum data for the Spectrum Channel display on display device 26 is accomplished by using approximately 4000 of the digital data values in the block of digital data. A Fast Fourier Transform (FFT) is applied to the time domain data to generate the frequency spectrum data which is stored in memory 20.

The measurement acquisition and display system 10 initially presents a main display on display device 26. The main display contains button icons representing various measurements and displays that may be made using the system 10. One of these measurements is a peak-to-average power ratio measurement. Touching the display device 26 on the peak-to-average power ratio button icon or clicking the mouse 30 on this button automatically initiates the acquisition and display of the CDF of peak-to-average power ratio data. At any time during the acquisition and display process, the setup button 56 may be invoked to launch the setup tabbed pages. The "Measurement" tabbed page 60, as shown in FIG. 3, allows a user to set a "Target Operating Point" in either "% of Time" or in "dB (Planning Factor)" by touching or clicking the mouse 30 on the appropriate option buttons 78 and 80. The appropriate "Target Operating Point" static text display 44 or 50 is present in display 40 with the spin box 46 configured for displaying dB values or percent of time values. The "Target Operating Point" is set by touching or clicking on the Up/Down arrow buttons 48.

The graphical display 42 in FIG. 2 includes a CDF plot of peak-to-average power ratio array data of the ideal transmitter signal 120 and a CDF plot of peak-to-average power ratio array data of the digitally modulated RF transmitter signal 122 being measured. Movable vertical and horizontal cross-hair cursors 124 and 126 intersect and are movable along the ideal peak-to-average power ratio plot 122 in response to the "Planning Factor" value increasing or decreasing using the up and down buttons 48 associated with the spin box 44. The vertical cross-hair cursor 124 moves along the Peak to Average Power Ratio X-axis and the horizontal cross-hair cursor 126 moves along the % of Time Y-axis. In the display of FIG. 2, the "Planning Factor" is set for 0.230% of time as shown in the spin box 46. The controller 24 searches the ideal array for the closest ideal percent of time value matching the "Planning Factor" value and positions the cross-hair cursors 124 and 126 on the ideal peak-to-average power ratio plot 122 that corresponds to the 0.230% of time on the Y-axis. The ideal peak-to-average power ratio value corresponding to ideal percent of time value in the ideal array is 6.0 dB and corresponds to the position of the vertical cross-hair cursor 124 on X-axis. The horizontal cross-hair cursor 126 intersects the CDF plot of peak-to-average power ratio array data of the RF transmitter signal 122 with the intersection point being the RF transmitter signal peak-to-average power ratio value at the "Planning Factor" value of 0.230%. The controller 24 searches the RF transmitter signal array for the closest percent of time value matching the "Planning Factor" value of 0.023% and uses the associated peak-to-average power ratio value as the RF transmitter signal peak-to-average power ratio value. This value is displayed in the "Peak to Average" static display area 52 as 5 dB. The controller 24 calculates the difference between the peak-to-average power ratio values of the RF transmitter signal and the ideal transmitter signal and displays the difference value in the "Actual-to-Ideal-Difference" static display area 54 as 1.0 dB. When the "Planning Factor" value is stated in dBs, the controller 24 searches the ideal array for the ideal peak-to-average power ratio value matching the "Planning Factor" value. The associated ideal percent of time value is used to search the RF transmission signal array for the closest percent of time value matching the ideal percent of time value. The RF transmitter signal peak-to-average power ratio value associated with the RF transmitter signal percent of time value is displayed in the "Peak to Average" static display area 56. As the "Planning Factor" value changes in the spin box 44, the "% of time" value associated with the "Planning Factor" changes accordingly, along with the "Peak to Average" value of the RF transmitter signal and the "Actual-to-Ideal Difference" value between the RF transmitter signal and the ideal transmitter signal.

Figure 7:
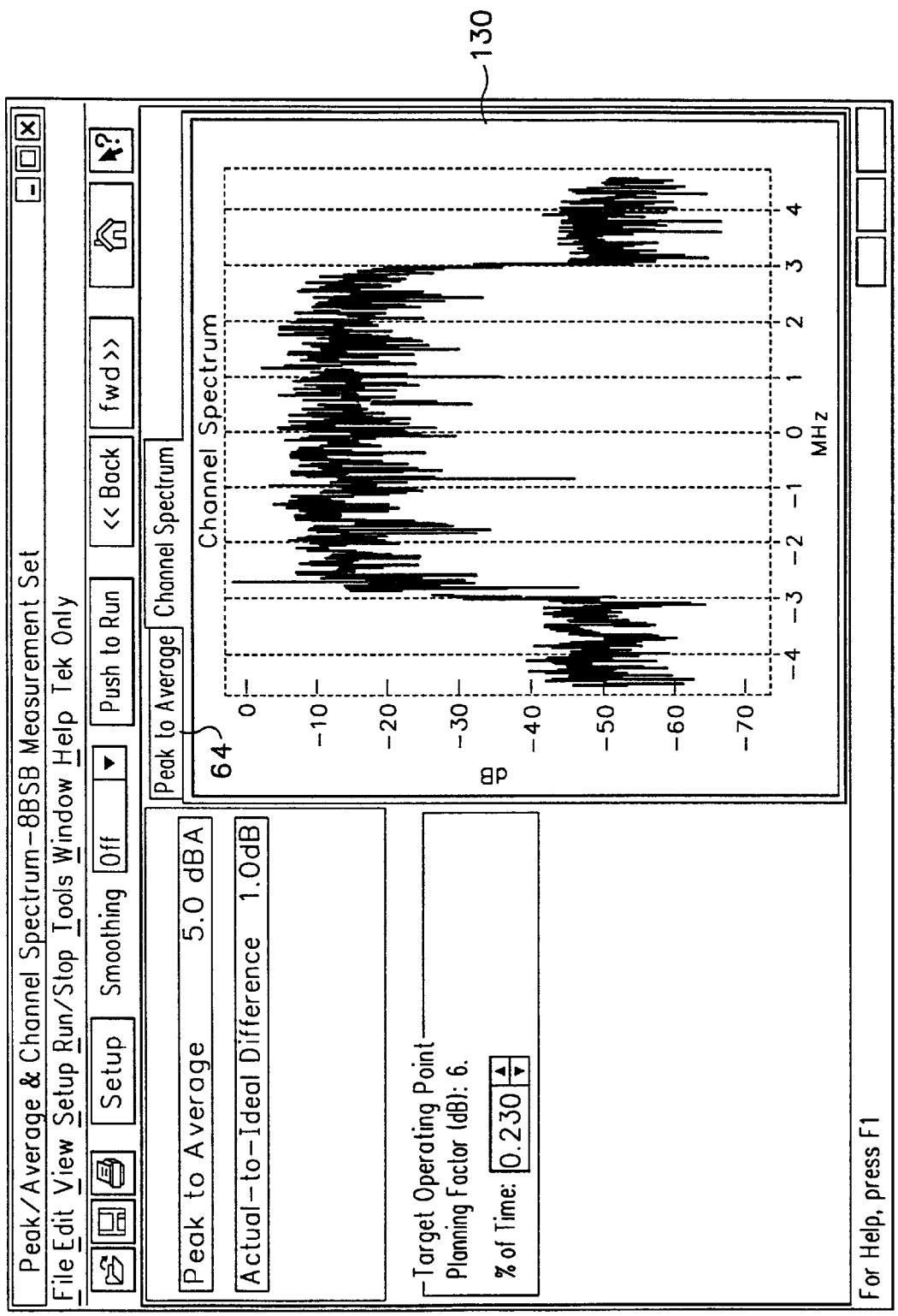
FIG. 7 is a channel spectrum display on the display device in the measurement acquisition and display system according to the present invention.

Graphically displaying both an ideal and real CDF of peak-to-average power ratio array data of the RF transmitter signal provides a significant improvement over previous instrument designs. An transmitter operator can quickly determine if the transmitter signal is not properly tuned by comparing the ideal CDF plot of peak-to-average power ratio with the real RF transmitter signal CDF plot of peak-to-average power ratio. For example, a RF transmitter signal CDF plot of peak-to-average power ratio, as represented by the dashed plot line 128, indicates that the transmitter is operating in compression and requires tuning. Without the ability to compare the real RF transmitter signal CDF plot of peak-to-average power ratio with an ideal CDF plot of peak-to-average power ratio, an operator would need to know what the ideal plot looks like and to visualize the real plot to the ideal plot or would have to have a physical copy of an ideal plot on hand to compare against the real plot. Another improvement is the ability to switch between the CDF plot of peak-to-average power ratio display and a frequency spectrum display of the channel frequency by clicking on the Channel Spectrum tab 66 using the mouse 30 or touching the display device 26. The graphical display 42 changes to the channel frequency spectrum display 130 as shown in FIG. 7. Having the channel frequency spectrum immediately available for display allows the operator to make adjustments to the transmitter based on the frequency spectrum envelope and immediately switch back to the CDF plot of peak-to-average power ratio display by clicking or touching the Peak to Average tab 64 and see the effects of those adjustments on the peak-to-average power ratio of the RF transmitter signal.

A further improvement of the measurement acquisition and measurement system of the present invention over existing transmitter RF signal measurement instruments is the capability to set "Limit Tests" that generate an alarm signal based on the "Power to Average" value or the "Actual to Ideal Difference" value. Referring back to FIG. 4, either the "Peak to Average" or the "Actual to Ideal Difference" "Limit Tests" may be set by clicking on the check boxes 92 and 94. Each "Limit Test" has a caution value 96 and an alarm value 98 that are settable by the operator. Alarm indicators, such as the "A" or other graphic indicators, are added to the "Actual-to-Ideal Difference" and the "Peak to Average" static display areas 54 and 52 when the respective alarms are activated. If the CDF of peak-to-average power ratio of the RF transmitter signal at the "Target Operating Point" exceeds the alarm limit values, the system of the present invention initiates an alarm signal.

A measurement acquisition and display system has been described that generates a CDF plot of peak-to-average power ratio data of the RF transmitter signal and graphically presents the data along with ideal CDF plot of peak-to-average power ratio data of an ideal RF transmitter signal on a display device. A processor accepts a "Planning Factor" value that is used to determine and display the peak-to-average power ratio value of the RF transmission signal in comparison with the an ideal peak-to-average power ratio value. The processor also computes and displays an actual to ideal difference value between the peak-to-average power ratio values of the RF transmission signal and the ideal RF transmitter signal. The processor also accepts alarm values for generating an alarm signal when the peak-to-average power ratio value or the actual to ideal difference value is greater than the alarm limits.

It will be obvious to those having skill in the art that many changes may be made to the details of the above-described embodiment of this invention without departing from the underlying principles thereof. The scope of the present invention should, therefore, be determined only by the following claims.

What is claimed is:

1. A measurement acquisition and display system suitable for receiving a digitally modulated radio frequency signal and generating digital data values representative of a digitally modulated intermediate frequency signal down converted from the digitally modulated radio frequency signal comprising:

a processor which processes the digital data values for generating an average power level value representative of the radio frequency signal and a first statistical array containing a first set of values representative of peak power levels of the radio frequency signal deviating from the average power level and a second set of values representative of percents of time the peak power levels deviate from the average power level with each peak-to-average power ratio value having an associated percent of time value;

a memory containing a second statistical array representative of a corresponding ideal digitally modulated radio frequency containing a first set of values representative of ideal peak-to-average power ratio values and a second set of values representative of ideal percents of time associated with the ideal peak-to-average power ratio values; and a display device which graphically displays the peak-to-average power ratio values and associated percent of time values of first and second statistical arrays representing the digitally modulated radio frequency signal and the corresponding ideal digitally modulated radio frequency signal.

2. The measurement acquisition and display system as recited in claim 1 further comprising the processor accepting a variable value representative of a planning factor value and matching the planning factor value with an ideal peak-to-average power ratio value for determining a corresponding peak-to-average power ratio value of the radio frequency signal by matching the ideal percent of time value associated with the ideal peak-to-average power ratio value with the closest percent of time value associated with the peak-to-average power ratio value of the radio frequency signal and calculating a difference value between the peak-to-average power ratio value of the radio frequency signal and the ideal peak-to-average power ratio value at the percent of time value, with the display device numerically displaying the variable value representative of the planning factor value and the ideal percent of time value associated with the ideal peak-to-average power ratio value matched to the planning factor value, the corresponding peak-to-average power ratio value of the radio frequency signal matched to the ideal percent of time value and the difference value between the peak-to-average power ratio value of the radio frequency signal and the ideal peak-to-average power ratio value.

3. The measurement acquisition and display system as recited in claim 2 further comprising the processor generating intersecting vertical and horizontal cursors having an intersecting point value equal to the ideal peak-to-average power ratio value matching the planning factor value and the display device graphically displaying the intersecting vertical and horizontal cursors with the intersection point positioned on the ideal digitally modulated radio frequency signal graphical display where the intersecting point value equals the ideal peak-to-average power ratio value.

4. The measurement acquisition and display system as recited in claim 1 further comprising the processor accepting a variable value representative of a percent of time planning factor value and matching the percent of time planning factor value with an ideal percent of time value and its associated ideal peak-to-average power ratio value for determining a corresponding peak-to-average power ratio value of the radio frequency signal by matching the ideal percent of time value with the closest percent of time value associated with the peak-to-average power ratio value of the radio frequency signal and calculating a difference value between the peak-to-average power ratio value of the radio frequency signal and the ideal peak-to-average power ratio value at the percent of time value, with the display device numerically displaying the variable value representative of the percent of time value planning factor value and the ideal peak-to-average power ratio value associated with the ideal percent of time value matched to the percent of time planning factor value, the corresponding peak-to-average power ratio value of the radio frequency signal and the difference value between the peak-to-average power ratio value of the radio frequency signal and the ideal peak-to-average power ratio value.

5. The measurement acquisition and display system as recited in claim 4 further comprising the processor generating intersecting vertical and horizontal cursors having an intersecting point value equal to the ideal percent of time value matching the planning factor value and the display device graphically displaying the intersecting vertical and horizontal cursors with the intersection point positioned on the ideal digitally modulated radio frequency signal graphical display where the intersecting point value equals the ideal percent of time value.

6. The measurement acquisition and display system as recited in claim 1 further comprising the processor accepting a variable value representing an alarm limit for generating and alarm signal when the peak-to-average power ratio value of the radio frequency signal corresponding to the ideal peak power level matched to the planning factor value exceeds the alarm limit.

7. The measurement acquisition and display system as recited in claim 1 further comprising the processor accepting a variable value representing an alarm limit for generating and alarm signal when the difference value between the peak-to-average power ratio value of the radio frequency signal and the ideal peak-to-average power ratio value at the percent of time value exceeds the alarm limit.

8. The measurement acquisition and display system as recited in claim 1 further comprising the processor processing the digital data values for generating frequency spectrum values representing the frequency spectrum of the digitally modulated radio frequency signal and the display device generating a graphical display of the frequency spectrum values representing the frequency spectrum of the digitally modulate radio frequency signal.

9. The measurement acquisition and display system as recited in claim 8 further comprising the processor accepting a first value representative of graphical display of the peak-to-average power ratio values and associated percent of time values of first and second statistical arrays representing the digitally modulated radio frequency signal and the corresponding ideal digitally modulated radio frequency signal and a second button value representative of the graphical display of the frequency spectrum values of the digitally modulated radio frequency signal for selectively displaying on the display device the graphical display of the peak-to-average power ratio values and associated percent of time values of first and second statistical arrays representing the digitally modulated radio frequency signal and the corresponding ideal digitally modulated radio frequency signal and the graphical display of the frequency spectrum values of the digitally modulated radio frequency signal.

* * * * *